Figure 1:
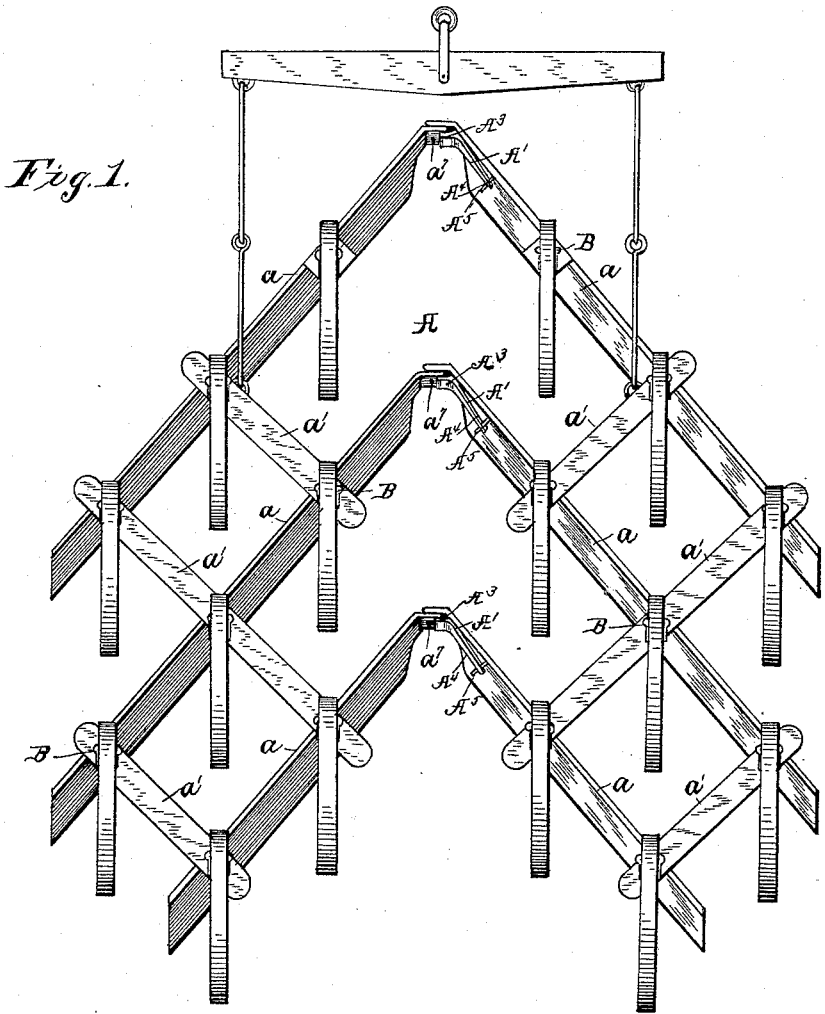

(No Model.)
2 Sheets—Sheet 1.

M. J. TODD.
SPRING TOOTH HARROW.

No. 436,445. Patented Sept. 16, 1890.

Witnesses.
Wm. S. Hodges.
Charles H. Rodgers.

Inventor.
Marquis J. Todd,
By Thos. W. McGill.
Attorney.

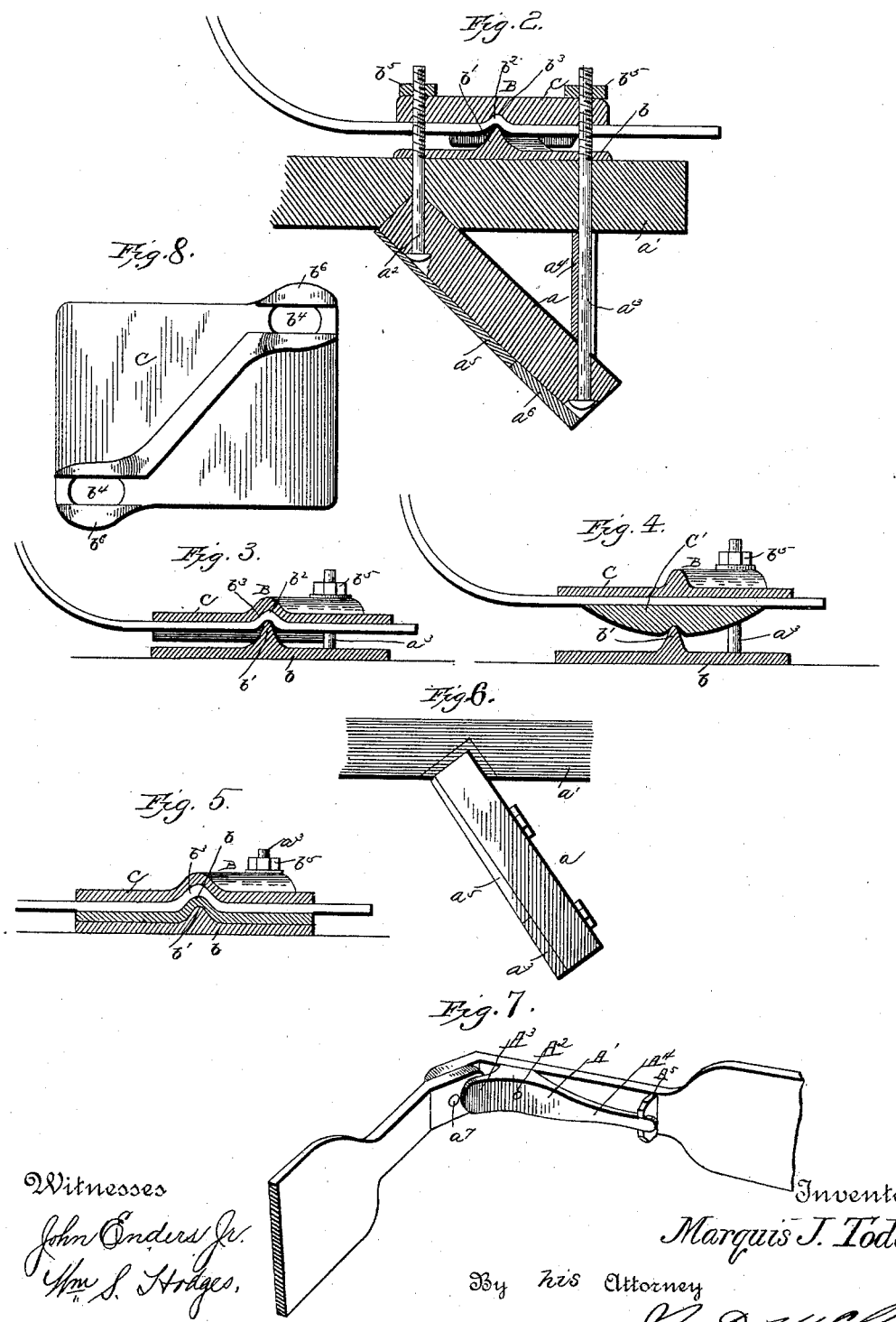

UNITED STATES PATENT OFFICE.

MARQUIS J. TODD, OF CORNING, NEW YORK.

SPRING-TOOTH HARROW.

SPECIFICATION forming part of Letters Patent No. 436,445, dated September 16, 1890.

Application filed April 27, 1889. Serial No. 308,847. (No model.)

*To all whom it may concern:*

Be it known that I, MARQUIS J. TODD, a citizen of the United States of America, residing at Corning, in the county of Steuben and State of New York, have invented certain new and useful Improvements in Spring-Tooth Harrows, of which the following is a specification, reference being had therein to the accompanying drawings.

This invention pertains to certain new and useful improvements in spring-tooth harrows in which the frame is preferably made in sections, hinged together in a central line extending from front to rear.

The object of my invention is fourfold: First, to produce a sectional harrow-frame for distributing the friction over a greater surface than heretofore, thereby avoiding the rapid wearing out of the frame at points and placing the draft-bars of each section at rearwardly-extending divergent angles from their inner meeting ends, whereby such rubbish, lumps, sods, &c., as are not crushed by the harrow are forced to each side thereof, and to incline the draft-bars so that the harrow will also serve as a clod-crusher; secondly, to so arrange or elevate the cross-bars of the frame that the same will be out of the way and permit such rubbish, lumps, sods, &c., to pass unobstructed to each side of the harrow; thirdly, to provide a new and improved form of connection between the sections of the harrow, and, fourthly, the production of a clip for securing the inner end of the spring-tooth in such manner that it can be readily adjusted and all unnecessay metal in the construction thereof dispensed with. With these and other objects in view I make the rearwardly-extending draft-bars inclined, their under surfaces having iron plates secured thereto, the thickened portions of which are designed to rest upon the earth and enable the harrow to readily ride over, or, by the draft-bars being divergent, force all obstructions not readily crushed or pulverized to either side of the harrow, thus permitting the latter to pass unobstructed and avoid having to raise the harrow to free the frame from contact with such rubbish, &c., which causes the raising of the teeth out of the soil, and by this construction the upper portions of the draft-bars are held elevated, and upon these elevated portions are secured the cross-bars, whereby the latter are held from contact with and permit the free passage of rubbish, stones, &c., to either side of the harrow. The inclined draft-bars serve to constitute a clod crusher or pulverizer, which, in addition to the breaking of the clods of earth, level or smooth the same in the passage of the harrow thereover.

The invention further comprises a new and improved clip having a crested base portion, upon which the inner end of the harrow-tooth bears, so as to be adjustable by a rocking motion, said tooth being held by a crown plate or cap secured by two nutted bolts, the adjustment of the nuts of which will effect the securing of the tooth at the desired angle.

The invention comprises the details of construction, combination, and arrangement of parts, substantially as hereinafter fully set forth, and particularly pointed out in the claims.

In the accompanying drawings, Figure 1 is a plan view of my improved harrow. Fig. 2 is an enlarged sectional view showing the intersection of two draft and cross bars and improved clip. Fig. 3 is a sectional view taken longitudinally through the clip. Figs. 4 and 5 are views showing the clip provided with intermediate plates. Figs. 6, 7, and 8 are details.

Referring to the drawings, A designates the harrow constructed in two sections, composed of parallel draft-bars $a$ and cross-bars $a'$, which intersect the former at about right angles, the draft-bar of each section being diverged from their inner meeting ends, as shown.

Each draft-bar $a$ is disposed at an angle or incline of about forty-five degrees, its upper portion being let into V-shaped grooves of the cross-bars or held by suitably-shaped plates secured to said iron bars. (See Fig. 7.) The draft-bars $a$ are held rigidly with relation to the cross-bars by nutted bolts $a^2$ $a^3$ passed through said bars, the bolt $a^2$ being partially inclosed by a curved plate $a^4$, attached to the bars $a$ $a'$. This plate $a^4$ serves to support the rear ends of the bars, or any other suitable support can be used in lieu thereof.

To the under side of each draft-bar $a$ is secured a metallic facing, preferably of two plates $a^5$ $a^6$, the latter being thickened or wedge-shaped, if desired, in its lower portion.

By thus inclining the draft-bars the wear or friction is thrown upon the extreme rear edge of each bar, or rather upon the metallic facing, and by means thereof the harrow will readily overcome the resistance of any obstructions, and rubbish can be readily passed over by the frame and not clog the same, as in harrows having depressed portions. The draft-bar being divergent can be placed at a greater angle than otherwise, and hence the cross-bars are held elevated at a high point. The ends of the draft-bars are bent, as shown, and in an aperture in the end of one of said bars is rigidly secured a stud or pin $a^7$, designed to project through a corresponding aperture of the adjoining end of the other draft-bar.

A' is a short lever fulcrumed at $A^2$ to one of the draft-bars of one section. This short lever has a slightly-curved end or arm $A^3$ and an extended spring-arm $A^4$, designed to rest in and be secured by a grooved or notched plate $A^5$, as shown.

In practice the lever A' is placed in an approximately vertical position to permit the overlapping bent ends of the adjoining draft-bars to be secured together by slipping one of said ends down on the stud or pin $a^7$. After the ends are thus secured the lever A' is turned on its fulcrum-pin, causing its short bent end or arm to overlap the end of the adjoining draft-bar, whereby the same is firmly held in position, said lever being held as against movement by its spring-arm resting in the groove of plate $A^5$. By this means the sections are readily and firmly united together, and so held as to permit the same to have a pivotal movement without danger of loosening or deranging any of the parts.

The next and main feature of my invention consists in the securing-clips B, one being located at each intersection of the bars.

The principal feature of my clip is that by means thereof the harrow-tooth is adjusted by a rocking motion effected mainly by a rocking crown-plate or an intermediate or rocking plate interposed between the tooth and a crested base-plate or resting directly upon the bars of the harrow-frame. This clip comprises a crested base-plate $b$, resting on the cross-bar and having a crested portion $b'$, formed therewith at an angle to its length. Upon this crest rests a correspondingly grooved or bent portion $b^2$ of the harrow-tooth, and upon the upper portion of the latter is a rocking crown-plate C, having a transverse groove $b^3$, into which the projection formed by the grooved portion $b^2$ of the tooth extends. Through diagonally-opposite oblong holes or openings $b^4$ $b^4$ of plate C are passed the bolts $a^2$ $a^3$, previously passed through apertures of plate $b$. The upper ends of these bolts have nuts $b^5 b^5$ screwed thereon and designed to rest upon slightly-curved shoulders $b^6$ around the holes or openings $b^4$, or between said tooth and the crested base-plate is placed an intermediate or second rocking plate C', provided with a groove larger than the crest $b'$, which projects thereinto, so as to permit said plate to rock on said crest in adjusting the tooth, which is disposed between the upper flat surface of plate C' and the rocking crown-plate. This form is shown in Fig. 4.

By reason of the crest $b'$ the plate C' is or plates C C' are capable of having a rocking motion, the oblong holes or openings $b^4$ permitting of such movement, and said bolts always retain a perpendicular position, while their nuts, by reason of the curvature of the shoulders $b^6$, preserve a horizontal position and have a firm seat or bearing. Thus it will be seen that when a tooth is secured in place the rocking of the crown-plate C in either direction and securing it by the nutted bolts will effect the adjustment of the spring-tooth at the desired plane, and that by reason of the grooved portion of the tooth fitting snugly the corresponding crested portion of the base-plate all lateral movement or shaking of the tooth is prevented. It is evident that the same adjustment can be obtained by omitting the groove or bent portion $b^2$ of the harrow-tooth and securing the tooth between the crown-plate and the intermediate rocking plate C'. By this form of adjustment the extra material in the tooth usually provided to permit longitudinal adjustment is dispensed with, as it is not necessary to move the flattened end of the tooth itself, as the position thereof is regulated by the rocking of the tooth by the adjustment of the crown-plate.

If desired, a stiffening-plate $C^2$ can be placed on the crested base-plate, of which it is a counterpart, so as to give increased strength at the point of contact at the inner end of the harrow-tooth with the base-plate. (See Fig. 5.)

In harrows having square frames it is obvious that the bold front thereof is a cause of resistance, and hence by slanting the draft-bars of my frame this is prevented, and lumps, &c., are more fully pulverized, and by diverging the draft-bars rearwardly they will force such rubbish, clods, &c., as are not crushed by the frame both forwardly and outwardly to either side of said frame, and the cross-bars being held elevated they permit of the free and unobstructed passage of such rubbish, &c., to the sides of the harrow; and that in frames having depressed portions in the draft-bars where the securing-clips are attached, said depressed portions meeting solid, fixed, or loose obstructions and the frame being solid, the resistance is greater, causing the jerking of the harrow, and consequently greater strain thereon and on the team, thus losing the very benefits sought to be derived from a springing tooth.

The advantages of my invention will be apparent to those skilled in the art to which it appertains, and it will be seen that, in addition to the improved draft-bars having the advantages stated, each spring-tooth can be readily and easily secured at the desired point, according to the nature of the soil being operated upon, and that to accomplish this purpose the clip is provided with a crested base-plate and an adjusting crown-plate, whereby said tooth can be easily adjusted by a rocking motion.

A harrow-frame constructed as herein described, in addition to serving as a clod-crusher, prevents sinking or settling of the harrow in soft or loose soil. By simply elevating the rear end of the harrow-teeth the frame can be used to advantage in smoothing the soil subsequent to the planting of seed or grain.

I claim as my invention—

1. A harrow-frame composed of a series of cross-bars and a series of draft-bars at right angles thereto, said draft-bars consisting each of a single rigid bar secured on an incline, their upper forward ends supporting said cross-bars, substantially as set forth, said draft-bars being diverged from their inner meeting ends, as stated.

2. A harrow-frame composed of a series of cross-bars having grooves in their under side, and a series of draft-bars at right angles thereto, said draft-bars consisting each of a single rigid bar having a wedge-shaped metallic facing and secured on an incline, their upper forward ends being disposed in said grooves of the cross-bars, substantially as set forth.

3. As an improvement in harrows composed of sections, the draft-bars having overlapping ends and the lever fulcrumed to one of said draft-bars and projecting over the end of the other draft-bar, substantially as described.

4. As an improvement in harrows composed of sections having draft-bars with apertured overlapping ends, the stud or pin secured to one of said draft-bars, the lever having the spring-arm, and the notched plate wherein said spring-arm rests, substantially as described.

5. As an improvement in harrows, the clip having a crested base portion, and the spring-tooth secured on the upper surface thereof and having its inner end conforming thereto, substantially as set forth.

6. As an improvement in harrows, the clip having a crested base portion, and the spring-tooth having a grooved or bent portion corresponding with and resting on said crested base portion, substantially as set forth.

7. As an improvement in harrows, the clip having a crested base portion, the spring-tooth having its inner end conforming to and resting on the upper surface of its bearing, and the adjustable crown-plate also conforming to said bearing, whereby the harrow-tooth is adjusted by rocking, substantially as set forth.

8. As an improvement in harrows, the clip having a crested base portion, the spring-tooth having a grooved or bent portion resting on said base portion, the crown-plate also having a crested portion fitting on said tooth, and the front and rear adjusting-bolts, substantially as set forth.

9. As an improvement in harrows, the clip having a crested base-plate, the harrow-tooth resting thereon, the upper adjusting crown-plate holding said tooth in place and having diagonally-opposed holes or openings, and the nutted bolts, substantially as set forth.

In testimony whereof I affix my signature in presence of two witnesses.

MARQUIS J. TODD.

Witnesses:
   JNO. D. McGILL,
   WM. S. HODGES.